April 26, 1955 H. A. SINSKI ET AL 2,706,910
DETERMINATION OF THE FILLING POWER OF FLUFFY BODIES
Filed Jan. 15, 1952
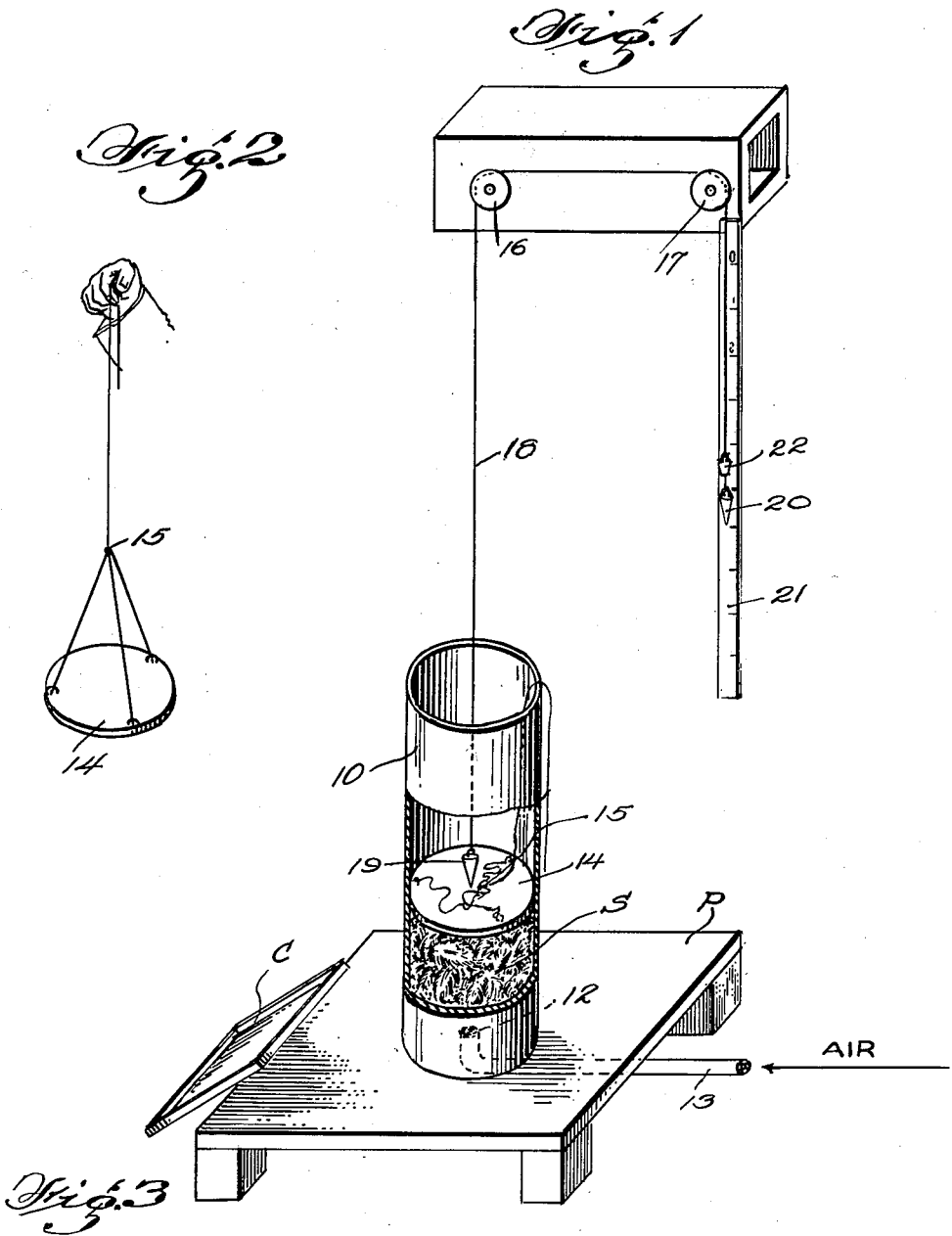
INVENTORS
Henry A. Sinski
Roger F. Kelly
BY W. J. Eccleston
ATTORNEY

United States Patent Office 2,706,910
Patented Apr. 26, 1955

2,706,910

DETERMINATION OF THE FILLING POWER OF FLUFFY BODIES

Henry A. Sinski, Aldan, and Roger F. Kelly, Philadelphia, Pa.

Application January 15, 1952, Serial No. 266,583

6 Claims. (Cl. 73—159)

(Granted under Title 35, U. S. Code (1952), sec. 266)

The invention described herein may be manufactured and used by or for the Government for governmental purposes, without the payment to us of any royalty thereon.

The present invention relates to a testing method and apparatus designed especially for determining the filling power of fluffy bodies, such as down and feathers and the like, wherein a sample is pneumatically fluffed and then subjected to a predetermined light load.

Our method and apparatus is thus mainly concerned with the determination of filling power or bulking value of filling material for sleeping bags and/or bedding, such as down, feathers, and also wool or cotton batts, and resin-impregnated glass-fiber briquettes (e. g. of the type disclosed in U. S. Patent No. 2,579,036, Norman B. Edelman).

The filling power test, as used in testing feathers and other fluffy bodies, measures the space occupied by a sample of predetermined size in a state of equilibrium under a light piston pressure without substantially compacting the sample; this test is not to be confused with the determination of the density of a body (fluffy or otherwise), because in density determinations (weight/volume) the air space between particles must necessarily be eliminated, while in the filling power test of fluffy bodies the air space is included in the computation. Filling material for sleeping bags and/or bedding, in order to be serviceable, must be characterized not only by softness and thermal insulation capacity, but also by adequate filling power, i. e. the capacity of "standing up" under the compressive load exerted by the body of the sleeper. Recovery of filling power is likewise of great importance, inasmuch as the compressive stress of the sleeper's body is repeatedly released and reapplied as a result of his movements during sleep; likewise, the conventional shaking out of sleeping bags and/or bedding in the daytime restores the comfort afforded by a filling material of good quality.

Our method and apparatus afford objective tests, not only of the initial filling power of fluffy bodies used as sleepings bags and/or bedding fillers, but also of the decrease in filling power during simulated use; this latter test determines the capacity of a given filling material for restoration of its initial filling power between uses.

The apparatus of the present invention is characterized by simplicity of construction and operation, one of its principal objects being the combination of means for pneumatically fluffing a sample of fluffable filling material (e. g. feathers), means for applying a light predetermined load to the fluffed sample, and means for measuring the height of the sample after equilibrium is reached.

A further object of the invention is the provision of semi-automatic means for setting up and precisely measuring representative samples of fluffy filling bodies, whereby errors due to variations in manipulation and measuring are minimized.

A still further object of the invention is the provision of a testing apparatus and method which permit a simulated use test of fluffy filling material without removing the sample from the apparatus prior to completion of the test.

Further objects and advantages of our invention will become apparent as the description thereof proceeds.

The accompanying drawings illustrate a preferred embodiment of our invention; more particularly:

Figure 1 is a perspective view of the testing apparatus, partly broken away;

Figure 2 is a detailed perspective view of the light piston or lid prior to insertion in the test cylinder of the apparatus shown in Fig. 1; and Figure 3 is a detailed top plan view of the testing cylinder shown in Fig. 1, prior to insertion of the piston or lid.

Referring more particularly to the drawings, the testing apparatus comprises a platform P on which is mounted a hollow container 10 of uniform cross section, preferably of cylindrical form and of substantial width, say 12.75", and substantial depth, say 36". The bottom 11 of the cylinder may be integral therewith or may be constituted by the surface of platform P. An inlet 12 for a stream of air (or other gas) is provided, e. g., in the bottom of the apparatus; this inlet may be a single hole, or a manifold (not shown), the opening or openings being sufficiently small (e. g. of the order of $\frac{1}{16}$ inch) to prevent entry of the test specimens therein. From inlet 12 extends an air line 13, through which dry air (or other gas) is blown from a conventional blower or compressed air cylinder with reduction valve (not shown).

The piston or lid 14 interfits with the inner wall of container 10, and in the cylindrical construction shown is of circular configuration. In the preferred form of our invention, lid 14 is a balsa wood disc 12.58" in diameter, which cooperates with a cylinder of 12.75" outer diameter. The inner diameter of cylinder 10 is but very slightly larger than the diameter of disc 14 to permit free sliding of the disc therein. Manipulating threads 15 are attached to disc 14 for level insertion of the disc into the cylinder. The weight of the disc is calculated to afford a predetermined light pressure per square inch, say .0021 lb./sq. in. A set of discs of varying light weights may be provided for comparative tests, e. g. a set for respective pressures of .0021, .0035 and .0055 lb./sq. in. pressure.

The manner of using the above described apparatus may now be explained.

A measured or weighed sample of the fluffy filling material to be tested, e. g. a .8 oz. sample S of European goose feathers is placed into cylinder 10. The cylinder is then covered with a cover C and a stream of air is turned on through pipe 13 and air inlet 12 until the feathers are entirely fluffed. At this point, the air is turned off and cover C is removed. Disc 14 is now gradually lowered into cylinder 10 by threads 15 and is allowed to settle horizontally on the surface of the fluffed sample.

The height (depth) of the sample may now be measured by conventional means, e. g. by measuring the depth of the descent of the disc into cylinder 10 and computing the difference between the height of the cylinder and the sum of the thickness of the disc and the distance of the top of the disc from the mouth of the cylinder. However, for greater accuracy, we prefer to use the pulley and plumb line arrangement about to be described.

A horizontally aligned spaced pair of grooved overhead pulleys 16, 17, rotating on horizontal axes, is mounted in such a manner that one of the pulleys, 16, is located above cylinder 10. The apparatus should be so arranged that center of gravity of lid 14, when in position in cylinder 10 is below a perpendicular line tangentially extending downwardly from the circular groove of pulley 16. A smooth thread 18 runs over pulleys 16 and 17 and terminates at either end in plumb bobs 19 and 20. A vertical scale 21 is arranged adjacent the path of plumb bob 20; scale 21 is graduated preferably in centimeters and millimeters, or in inches and fractions of inches, the graduations reading progressively downwardly from the top of the gauge. In order to achieve greater precision in reading the scale, we prefer to use a light movable spring clip 22 (weighing about $\frac{1}{10}$ g.), clipped to line 18 slightly above plumb bob 20; this spring clip, rather than plumb bob 20 is preferably used as a reader for scale 21. The plumb gauge is zeroed by inserting disc 14 into the empty cylinder 10 and lowering plumb bob 19 until its tip touches the center of disc 14. Spring clip 22 is then adjusted to align its lower edge with the zero mark or scale 21. Plumb bob 19 may now be raised to clear the mouth of cylinder 10. After a sample S has been placed into cylinder 10, pneumatically fluffed in the manner just described, and disc 14 has settled on the fluffed sample in an equilibrium position, plumb bob 19 is again lowered until it touches the center of lid 14. The position of the lower edge of spring clip 22 on scale 21 indicates the height (depth) of the sample S at equilibrium, which in turn measures the initial filling power of the sample.

The same arrangement may be used in the following manner to determine the change of filling power of the material to be tested as the result of simulated use. The initial filling power of the sample is measured in the manner just described. Plumb bob 19 is now raised out of the way, and the sample is subjected to repeated compression by a predetermined relatively heavy load; say a weighted disc (not shown) sufficiently heavy to exert a pressure of 1.6 lb./sq. in. The heavy weight is applied for a predetermined time, say five hours, and during this period is repeatedly, say five times lifted and reapplied in order to simulate bodily movements of a sleeper. The weighted disc is now removed, the cylinder is again covered with cover C, and air is blown through the sample to re-fluff the same (thereby simulating the shaking out of a sleeping bag or bedding). After turning the air off, cover C is removed, and the same light-weight disc used for the measurement of the initial filling power of the sample is gently reinserted into cylinder 10, and after it reaches equilibrium the height (depth) of the sample is again measured by lowering plumb bob 19 onto lid 14 and reading the position of the lower edge of spring clip 22. The decrease in filling power of the sample, occasioned by the foregoing simulated use test, is indicated by the difference between the first and second measurements, which may be expressed either in length units or in percentage figures. Thus, a sample of European goose feathers, measured as above described, was found to have an original filling power of 8.6 cm., and a final filling power (after simulated use test) of 8.4 cm., which corresponds to a decrease in filling power of .2 cm. or 2.3%; conversely, the recovered filling power of the re-fluffed sample may be stated as 97.7% (100—2.3%).

The numerical values found for filling power of feathers, etc., in accordance with the foregoing test procedure will of course vary if samples of different weights, test cylinders of different dimensions, and/or lids exerting different lb./sq. in. pressure are employed. However, once these variables are standardized (e. g. at the preferred values given in this specification), the test results will be found to furnish statistically valid numerical results. Moreover, if the decrease in filling power or the filling power recovery is computed in percentage terms in the simulated use test, the percentage values for a given type of fluffy filling material will be the same regardless of size of sample or dimensions of apparatus; however, the sensitivity of the test will be adversely affected if the slidable lid is not characterized by light weight.

Instead of locating the gas inlet at the bottom of the container, the air or other gas for fluffing the feathers, etc., may also be supplied by a nozzle attached to a hose running transversely through cover C, or other equivalent arrangements.

It will be seen from the foregoing description of a preferred embodiment of our testing apparatus and of the manner in which it may be used, that we have provided a useful and sensitive research tool and method for reading the quality of natural and artificial fluffy filling materials for sleeping bags, bedding, cushions, and the like. It will be obvious that changes and modifications of the preferred embodiment and in its described use may be made without departing from the spirit of our invention; we therefore desire to encompass such modifications and variations within the scope of our invention and define the latter by the appended claims.

We claim:
1. Apparatus for determining the filling power of fluffy bodies, comprising an open-mouthed container of uniform substantially wide cross-section, there being a gas inlet in the interior of said container, means for supplying a stream of gas to said inlet for fluffing a sample of said fluffy bodies in said container, a lid of predetermined light weight interfitting with the inner wall of and freely slidable in said container for placing said sample of fluffy bodies in a state of equilibrium without substantially compressing said sample, and means for measuring the height of said lid in said container when said lid is supported by said fluffed sample.

2. Apparatus for determining the filling power of fluffy bodies, comprising an open-mouthed cylindrical container of substantial depth and uniform wide cross-section, there being a gas inlet in the interior of said container, means for supplying a stream of gas to said inlet for fluffing a sample of said fluffy bodies in said container, a circular disc of predetermined light weight interfitting with the inner wall of and freely slidable in said container for placing said sample of fluffy bodies in a state of equilibrium without substantially compressing said sample, and means for measuring the height of said disc in said container when said disc is supported by said fluffed sample, said last-named means including a plumb line and a pulley above said cylinder, said plumb line running over said pulley, one end of said plumb line being positioned substantially above the center of said disc.

3. Apparatus for determining the filling power of fluffy bodies, comprising an open-mouthed container of uniform substantially wide cross-section, there being a gas inlet in the bottom portion of said container, means for supplying a stream of gas to said inlet for fluffing a sample of said fluffy bodies in said container, a lid of predetermined light weight interfitting with the inner wall of and freely slidable in said container for placing said sample of fluffy bodies in a state of equilibrium without substantially compressing said sample, and means for measuring the height of said lid in said container when said lid is supported by said fluffed sample.

4. Apparatus for determining the filling power of fluffy bodies comprising a container of uniform substantially wide cross-section, there being a gas inlet in the interior of said container, means for supplying a stream of gas to said inlet for fluffing a sample of said fluffy bodies in said container, a lid of predetermined light weight interfitting with the inner wall of and freely slidable in said container, and means for measuring the height of said lid in said container when said lid is supported by said fluffed sample, said last-named means comprising a pulley rotatable around a horizontal axis positioned above said lid, a pair of plumbs suspended from opposite ends of a line running over said pulley, one of said plumbs being positioned substantially above the center of gravity of said lid, and means for measuring the height level of said last-named plumb.

5. Apparatus for determining the filling power of fluffy bodies, comprising a container of uniform substantially wide cross-section, there being a gas inlet in the interior of said container, means for supplying a stream of gas to said inlet for fluffing a sample of said fluffy bodies in said container, a lid of predetermined light weight interfitting with the inner wall of and freely slidable in said container, and means for measuring the height of said lid in said container when said lid is supported by said fluffed sample, said last-named means comprising a pair of horizontally aligned spaced pulleys, a pair of plumbs suspended from opposite ends of a line running over said pulleys, one of said plumbs being positioned substantially above the center of gravity of said lid, said last-named means also including vertical length indicia adjacent the path of the other of said plumbs for determining the height of said plumbs when said first-named plumb contacts said lid.

6. Apparatus for determining the filling power of fluffy bodies, comprising a hollow cylinder of substantial width and having a bottom, a gas inlet in said bottom, there being means for supplying a stream of gas to said inlet for fluffing a sample of said fluffy bodies in said cylinder, a disc of predetermined light weight interfitting with the inner wall of and freely slidable in said cylinder, and means for measuring the height of said disc in said cylinder when said disc is supported by said fluffed sample, said last-named means including a plumb line and a pulley above said cylinder, said plumb line running over said pulley, one end of said plumb line being positioned substantially above the center of gravity of said disc.

References Cited in the file of this patent

UNITED STATES PATENTS

| | | |
|---|---|---|
| 1,288,746 | Thacher | Dec. 24, 1918 |
| 1,391,504 | Renkin | Sept. 20, 1921 |
| 2,292,897 | Nielsen | Aug. 11, 1942 |
| 2,325,026 | Anway | July 27, 1943 |
| 2,373,026 | Guyer et al. | Apr. 3, 1945 |
| 2,529,843 | Kehrer | Nov. 14, 1950 |
| 2,659,433 | Brown | Nov. 17, 1953 |